United States Patent
Kato (10) Patent No.: US 8,390,459 B2
(45) Date of Patent: Mar. 5, 2013

(54) WIRELESS IC DEVICE

(75) Inventor: Noboru Kato, Moriyama (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 850 days.

(21) Appl. No.: 12/510,344

(22) Filed: Jul. 28, 2009

(65) Prior Publication Data

US 2009/0278687 A1 Nov. 12, 2009

Related U.S. Application Data

(63) Continuation of application No. PCT/JP2008/051853, filed on Feb. 5, 2008.

(30) Foreign Application Priority Data

Apr. 6, 2007 (JP) ................................. 2007-101058

(51) Int. Cl.
*G08B 13/14* (2006.01)

(52) U.S. Cl. ...................... 340/572.7; 343/742; 343/878

(58) Field of Classification Search ............... 340/572.1, 340/572.7, 10.1; 235/492; 343/741, 742, 343/878
See application file for complete search history.

(56) References Cited

U.S. PATENT DOCUMENTS

| | | |
|---|---|---|
| 3,364,564 A | 1/1968 | Kurtz et al. |
| 4,794,397 A | 12/1988 | Ohe et al. |
| 5,232,765 A | 8/1993 | Yano et al. |
| 5,253,969 A | 10/1993 | Richert |
| 5,337,063 A | 8/1994 | Takahira |
| 5,374,937 A | 12/1994 | Tsunekawa et al. |
| 5,399,060 A | 3/1995 | Richert |
| 5,491,483 A | 2/1996 | D'Hont |
| 5,757,074 A | 5/1998 | Matloubian et al. |
| 5,854,480 A | 12/1998 | Noto |
| 5,903,239 A | 5/1999 | Takahashi et al. |
| 5,936,150 A | 8/1999 | Kobrin et al. |
| 5,955,723 A | 9/1999 | Reiner |
| 5,995,006 A | 11/1999 | Walsh |
| 6,104,311 A | 8/2000 | Lastinger |
| 6,107,920 A | 8/2000 | Eberhardt et al. |
| 6,172,608 B1 | 1/2001 | Cole |
| 6,181,287 B1 | 1/2001 | Beigel |
| 6,190,942 B1 | 2/2001 | Wilm et al. |

(Continued)

FOREIGN PATENT DOCUMENTS

| | | |
|---|---|---|
| EP | 0 694 874 A2 | 1/1996 |
| EP | 0 977 145 A2 | 2/2000 |

(Continued)

OTHER PUBLICATIONS

Official Communication issued in International Application No. PCT/JP2007/066007, mailed on Nov. 27, 2007.

(Continued)

*Primary Examiner* — Thomas Mullen
(74) *Attorney, Agent, or Firm* — Keating & Bennett, LLP (57) ABSTRACT

A wireless IC device includes an electromagnetic coupling module, which includes a feeder circuit board having a wireless IC chip arranged to process transmission and reception signals mounted thereon, and a radiation plate. Linear loop electrodes provided in the radiation plate are electromagnetically coupled to planar electrodes located on a surface of the feeder circuit board. A signal received by the radiation plate drives the wireless IC chip. A response signal from the wireless IC chip is transmitted to the outside from the radiation plate. A frequency of the transmission and reception signals is substantially determined by inductance of the loop electrodes, capacitance between the loop electrodes and the planar electrodes, and stray capacitance generated between lines of the loop electrodes.

14 Claims, 5 Drawing Sheets

U.S. PATENT DOCUMENTS

| | | |
|---|---|---|
| 6,259,369 B1 | 7/2001 | Monico |
| 6,271,803 B1 | 8/2001 | Watanabe et al. |
| 6,335,686 B1 | 1/2002 | Goff et al. |
| 6,362,784 B1 | 3/2002 | Kane et al. |
| 6,367,143 B1 | 4/2002 | Sugimura |
| 6,378,774 B1 | 4/2002 | Emori et al. |
| 6,406,990 B1 | 6/2002 | Kawai |
| 6,448,874 B1 | 9/2002 | Shiino et al. |
| 6,462,716 B1 | 10/2002 | Kushihi |
| 6,542,050 B1 | 4/2003 | Arai et al. |
| 6,600,459 B2 | 7/2003 | Yokoshima et al. |
| 6,634,564 B2 | 10/2003 | Kuramochi |
| 6,664,645 B2 | 12/2003 | Kawai |
| 6,763,254 B2 | 7/2004 | Nishikawa |
| 6,828,881 B2 | 12/2004 | Mizutani et al. |
| 6,927,738 B2 | 8/2005 | Senba et al. |
| 6,963,729 B2 | 11/2005 | Uozumi |
| 7,088,307 B2 | 8/2006 | Imaizumi |
| 7,112,952 B2 | 9/2006 | Arai et al. |
| 7,119,693 B1 | 10/2006 | Devilbiss |
| 7,129,834 B2 | 10/2006 | Naruse et al. |
| 7,248,221 B2 | 7/2007 | Kai et al. |
| 7,250,910 B2 | 7/2007 | Yoshikawa et al. |
| 7,276,929 B2 | 10/2007 | Arai et al. |
| 7,317,396 B2 | 1/2008 | Ujino |
| 7,405,664 B2 | 7/2008 | Sakama et al. |
| 2002/0011967 A1 | 1/2002 | Goff et al. |
| 2002/0044092 A1 | 4/2002 | Kushihi |
| 2002/0067316 A1 | 6/2002 | Yokoshima et al. |
| 2003/0006901 A1 | 1/2003 | Kim et al. |
| 2003/0020661 A1 | 1/2003 | Sato |
| 2003/0169153 A1 | 9/2003 | Muller |
| 2004/0001027 A1 | 1/2004 | Killen et al. |
| 2004/0066617 A1 | 4/2004 | Hirabayashi et al. |
| 2004/0217915 A1 | 11/2004 | Imaizumi |
| 2004/0219956 A1 | 11/2004 | Iwai et al. |
| 2004/0227673 A1 | 11/2004 | Iwai et al. |
| 2005/0092836 A1 | 5/2005 | Kudo |
| 2005/0099337 A1 | 5/2005 | Takei et al. |
| 2005/0125093 A1 | 6/2005 | Kikuchi et al. |
| 2005/0134460 A1 | 6/2005 | Usami |
| 2005/0138798 A1 | 6/2005 | Sakama et al. |
| 2005/0140512 A1 | 6/2005 | Sakama et al. |
| 2005/0232412 A1 | 10/2005 | Ichihara et al. |
| 2005/0236623 A1 | 10/2005 | Takechi et al. |
| 2005/0275539 A1 | 12/2005 | Sakama et al. |
| 2006/0001138 A1 | 1/2006 | Sakama et al. |
| 2006/0043198 A1 | 3/2006 | Forster |
| 2006/0044769 A1 | 3/2006 | Forster et al. |
| 2006/0055601 A1 | 3/2006 | Kameda et al. |
| 2006/0071084 A1 | 4/2006 | Detig et al. |
| 2006/0109185 A1 | 5/2006 | Iwai et al. |
| 2006/0145872 A1 | 7/2006 | Tanaka et al. |
| 2006/0158380 A1 | 7/2006 | Son et al. |
| 2006/0170606 A1 | 8/2006 | Yamagajo et al. |
| 2006/0220871 A1 | 10/2006 | Baba et al. |
| 2006/0267138 A1 | 11/2006 | Kobayashi |
| 2007/0004028 A1 | 1/2007 | Lair et al. |
| 2007/0018893 A1 | 1/2007 | Kai et al. |
| 2007/0040028 A1 | 2/2007 | Kawamata |
| 2007/0052613 A1 | 3/2007 | Gallschuetz et al. |
| 2007/0069037 A1 | 3/2007 | Kawai |
| 2007/0132591 A1 | 6/2007 | Khatri |
| 2007/0164414 A1 | 7/2007 | Dokai et al. |
| 2007/0252700 A1 | 11/2007 | Ishihara et al. |
| 2007/0252703 A1 | 11/2007 | Kato et al. |
| 2007/0285335 A1 | 12/2007 | Bungo et al. |
| 2008/0024156 A1 | 1/2008 | Arai et al. |
| 2008/0087990 A1 | 4/2008 | Kato et al. |
| 2008/0169905 A1 | 7/2008 | Slatter |
| 2008/0272885 A1 | 11/2008 | Atherton |
| 2009/0002130 A1 | 1/2009 | Kato |
| 2009/0009007 A1 | 1/2009 | Kato et al. |
| 2009/0065594 A1 | 3/2009 | Kato et al. |

FOREIGN PATENT DOCUMENTS

| | | |
|---|---|---|
| EP | 1 010 543 A1 | 6/2000 |
| EP | 1 160 915 A2 | 12/2001 |
| EP | 1 170 795 A2 | 1/2002 |
| JP | 50-143451 A | 11/1975 |
| JP | 62-127140 U | 8/1987 |
| JP | 03-262313 A | 11/1991 |
| JP | 04-150011 A | 5/1992 |
| JP | 04-167500 A | 6/1992 |
| JP | 05-327331 A | 12/1993 |
| JP | 6-53733 A | 2/1994 |
| JP | 06-077729 A | 3/1994 |
| JP | 06-177635 A | 6/1994 |
| JP | 07-183836 A | 7/1995 |
| JP | 08-056113 A | 2/1996 |
| JP | 8-87580 A | 4/1996 |
| JP | 11-149537 A | 6/1996 |
| JP | 08-176421 A | 7/1996 |
| JP | 08-180160 A | 7/1996 |
| JP | 08-279027 A | 10/1996 |
| JP | 08-307126 A | 11/1996 |
| JP | 08-330372 A | 12/1996 |
| JP | 09-014150 A | 1/1997 |
| JP | 09-035025 A | 2/1997 |
| JP | 09-245381 A | 9/1997 |
| JP | 09-252217 A | 9/1997 |
| JP | 09-270623 A | 10/1997 |
| JP | 9-512367 A | 12/1997 |
| JP | 10-069533 A | 3/1998 |
| JP | 10-505466 A | 5/1998 |
| JP | 10-171954 A | 6/1998 |
| JP | 10-193849 A | 7/1998 |
| JP | 10-293828 A | 11/1998 |
| JP | 11-039441 A | 2/1999 |
| JP | 11-085937 A | 3/1999 |
| JP | 11-102424 A | 4/1999 |
| JP | 11-103209 A | 4/1999 |
| JP | 11-149536 A | 6/1999 |
| JP | 11-149538 A | 6/1999 |
| JP | 11-219420 A | 8/1999 |
| JP | 11-220319 A | 8/1999 |
| JP | 11-328352 A | 11/1999 |
| JP | 11-346114 A | 12/1999 |
| JP | 11-515094 A | 12/1999 |
| JP | 2000-21128 A | 1/2000 |
| JP | 2000-021639 A | 1/2000 |
| JP | 2000-022421 A | 1/2000 |
| JP | 2005-229474 A | 1/2000 |
| JP | 2000-059260 A | 2/2000 |
| JP | 2000-085283 A | 3/2000 |
| JP | 2000-090207 A | 3/2000 |
| JP | 2000067197 A * | 3/2000 |
| JP | 2000-132643 A | 5/2000 |
| JP | 2000-137778 A | 5/2000 |
| JP | 2000-137785 A | 5/2000 |
| JP | 2000-148948 A | 5/2000 |
| JP | 2000-172812 A | 6/2000 |
| JP | 2000-222540 A | 8/2000 |
| JP | 2000-510271 A | 8/2000 |
| JP | 2000-243797 A | 9/2000 |
| JP | 2000-251049 A | 9/2000 |
| JP | 2000-276569 A | 10/2000 |
| JP | 2000-286634 A | 10/2000 |
| JP | 2000-286760 A | 10/2000 |
| JP | 2000-311226 A | 11/2000 |
| JP | 2000-321984 A | 11/2000 |
| JP | 3075400 U | 11/2000 |
| JP | 2000-349680 A | 12/2000 |
| JP | 2001-028036 A | 1/2001 |
| JP | 2007-18067 A | 1/2001 |
| JP | 2001-043340 A | 2/2001 |
| JP | 2001-66990 A | 3/2001 |
| JP | 2001-505682 A | 4/2001 |
| JP | 2001-168628 A | 6/2001 |
| JP | 2001-188890 A | 7/2001 |
| JP | 2001-240046 A | 9/2001 |
| JP | 2001-256457 A | 9/2001 |
| JP | 2001-514777 A | 9/2001 |
| JP | 2001-319380 A | 11/2001 |

| | | |
|---|---|---|
| JP | 2001-331976 A | 11/2001 |
| JP | 2001-332923 A | 11/2001 |
| JP | 2001-344574 A | 12/2001 |
| JP | 2001-351084 A | 12/2001 |
| JP | 2001-352176 A | 12/2001 |
| JP | 2002-024776 A | 1/2002 |
| JP | 2002-026513 A | 1/2002 |
| JP | 2002-042076 A | 2/2002 |
| JP | 2002-063557 A | 2/2002 |
| JP | 2002-505645 A | 2/2002 |
| JP | 2002-076750 A | 3/2002 |
| JP | 2002-76750 A | 3/2002 |
| JP | 2002-150245 A | 5/2002 |
| JP | 2002-158529 A | 5/2002 |
| JP | 2002-175508 A | 6/2002 |
| JP | 2002-183690 A | 6/2002 |
| JP | 2002-185358 A | 6/2002 |
| JP | 2002-204117 A | 7/2002 |
| JP | 2002-522849 A | 7/2002 |
| JP | 2002-230128 A | 8/2002 |
| JP | 2002-252117 A | 9/2002 |
| JP | 2002-259934 A | 9/2002 |
| JP | 2002-298109 A | 10/2002 |
| JP | 2002-308437 A | 10/2002 |
| JP | 2002-319008 A | 10/2002 |
| JP | 2002-362613 A | 12/2002 |
| JP | 2002-373029 A | 12/2002 |
| JP | 2002-373323 A | 12/2002 |
| JP | 2002-374139 A | 12/2002 |
| JP | 2003-006599 A | 1/2003 |
| JP | 2003-016412 A | 1/2003 |
| JP | 2003-030612 A | 1/2003 |
| JP | 2003-44789 A | 2/2003 |
| JP | 2003-046318 A | 2/2003 |
| JP | 2003-58840 A | 2/2003 |
| JP | 2003-067711 A | 3/2003 |
| JP | 2003-069335 A | 3/2003 |
| JP | 2003-076947 A | 3/2003 |
| JP | 2003-085501 A | 3/2003 |
| JP | 2003-085520 A | 3/2003 |
| JP | 2003-87008 A | 3/2003 |
| JP | 2003-87044 A | 3/2003 |
| JP | 2003-099720 A | 4/2003 |
| JP | 2003-099721 A | 4/2003 |
| JP | 2003-110344 A | 4/2003 |
| JP | 2003-132330 A | 5/2003 |
| JP | 2003-134007 A | 5/2003 |
| JP | 2003-155062 A | 5/2003 |
| JP | 2003-158414 A | 5/2003 |
| JP | 2003-187207 A | 7/2003 |
| JP | 2003-187211 A | 7/2003 |
| JP | 2003-188338 A | 7/2003 |
| JP | 2003-198230 A | 7/2003 |
| JP | 2003-209421 A | 7/2003 |
| JP | 2003-216919 A | 7/2003 |
| JP | 2003-218624 A | 7/2003 |
| JP | 2003-233780 A | 8/2003 |
| JP | 2003-242471 A | 8/2003 |
| JP | 2003-243918 A | 8/2003 |
| JP | 2003-249813 A | 9/2003 |
| JP | 2003-529163 A | 9/2003 |
| JP | 2003-288560 A | 10/2003 |
| JP | 2003-309418 A | 10/2003 |
| JP | 2003-317060 A | 11/2003 |
| JP | 2003-331246 A | 11/2003 |
| JP | 2003-332820 A | 11/2003 |
| JP | 2004-040597 A | 2/2004 |
| JP | 2004-082775 A | 3/2004 |
| JP | 2004-88218 A | 3/2004 |
| JP | 2004-096566 A | 3/2004 |
| JP | 2004-253858 A | 9/2004 |
| JP | 2004-527864 A | 9/2004 |
| JP | 2004-280390 A | 10/2004 |
| JP | 2004-287767 A | 10/2004 |
| JP | 2004-297249 A | 10/2004 |
| JP | 2004-297681 A | 10/2004 |
| JP | 2004-319848 A | 11/2004 |
| JP | 2004-326380 A | 11/2004 |
| JP | 2004-334268 A | 11/2004 |
| JP | 2004-336250 A | 11/2004 |
| JP | 2004-343000 A | 12/2004 |
| JP | 2004-362190 A | 12/2004 |
| JP | 2004-362341 A | 12/2004 |
| JP | 2004-362602 A | 12/2004 |
| JP | 2005-124061 A | 5/2005 |
| JP | 2005-129019 A | 5/2005 |
| JP | 2005-136528 A | 5/2005 |
| JP | 3653099 B2 | 5/2005 |
| JP | 2005-165839 A | 6/2005 |
| JP | 2005-167327 A | 6/2005 |
| JP | 2005-167813 A | 6/2005 |
| JP | 2005-190417 A | 7/2005 |
| JP | 2005-191705 A | 7/2005 |
| JP | 2005-210676 A | 8/2005 |
| JP | 2005-210680 A | 8/2005 |
| JP | 2005-217822 A | 8/2005 |
| JP | 2005-236339 A | 9/2005 |
| JP | 2005-244778 A | 9/2005 |
| JP | 2005-275870 A | 10/2005 |
| JP | 2005-284352 A | 10/2005 |
| JP | 2005-295135 A | 10/2005 |
| JP | 2005-311205 A | 11/2005 |
| JP | 2005-321305 A | 11/2005 |
| JP | 2005-335755 A | 12/2005 |
| JP | 2005-346820 A | 12/2005 |
| JP | 2005-352858 A | 12/2005 |
| JP | 2006-025390 A | 1/2006 |
| JP | 2006-031766 A | 2/2006 |
| JP | 2006-39902 A | 2/2006 |
| JP | 2006-67479 A | 3/2006 |
| JP | 2006-72706 A | 3/2006 |
| JP | 2006-80367 A | 3/2006 |
| JP | 2006-92630 A | 4/2006 |
| JP | 2006-102953 A | 4/2006 |
| JP | 2006-107296 A | 4/2006 |
| JP | 2006-148518 A | 6/2006 |
| JP | 2006-174151 A | 6/2006 |
| JP | 2006-195795 A | 7/2006 |
| JP | 2006-203187 A | 8/2006 |
| JP | 2006-203852 A | 8/2006 |
| JP | 2006-217000 A | 8/2006 |
| JP | 2006-232292 A | 9/2006 |
| JP | 2006-270212 A | 10/2006 |
| JP | 2006-285911 A | 10/2006 |
| JP | 2006-302219 A | 11/2006 |
| JP | 2006-309401 A | 11/2006 |
| JP | 2006-323481 A | 11/2006 |
| JP | 2007-043535 A | 2/2007 |
| JP | 2007-048126 A | 2/2007 |
| JP | 2007-65822 A | 3/2007 |
| JP | 2007-096768 A | 4/2007 |
| JP | 2007-122542 A | 5/2007 |
| JP | 2007-150868 A | 6/2007 |
| JP | 2007-159129 A | 6/2007 |
| JP | 4069958 B2 | 4/2008 |
| JP | 11-175678 A | 1/2009 |
| NL | 9100176 | 3/1992 |
| NL | 9100347 A | 3/1992 |
| WO | 99/67754 A1 | 12/1999 |
| WO | 00/10122 A2 | 2/2000 |
| WO | 02/061675 A1 | 8/2002 |
| WO | 02/097723 A1 | 12/2002 |
| WO | 03/079305 A1 | 9/2003 |
| WO | 2004/036772 A1 | 4/2004 |
| WO | 2004/070879 A | 8/2004 |
| WO | 2004/072892 A1 | 8/2004 |
| WO | 2005/073937 A | 8/2005 |
| WO | 2005/115849 A1 | 12/2005 |
| WO | 2006/045682 A | 5/2006 |
| WO | 2007/083574 A1 | 7/2007 |
| WO | 2007/125683 A1 | 11/2007 |
| WO | 2007/138857 A1 | 12/2007 |

OTHER PUBLICATIONS

Dokai et al.: "Wireless IC Device and Component for Wireless IC Device"; U.S. Appl. No. 12/359,690, filed Jan. 26, 2009.

Dokai et al.: "Test System for Radio Frequency IC Devices and Method of Manufacturing Radio Frequency IC Devices Using the Same"; U.S. Appl. No. 12/388,826, filed Feb. 19, 2009.
Official Communication issued in International Application No. PCT/JP2008/061955, mailed on Sep. 30, 2008.
Official Communication issued in International Application No. PCT/JP2007/066721, mailed on Nov. 27, 2007.
Official Communication issued in International Application No. PCT/JP2007/070460, mailed on Dec. 11, 2007.
Kato et al.: "Wireless IC Device"; U.S. Appl. No. 12/390,556, filed Feb. 23, 2009.
Kato et al.: "Inductively Coupled Module and Item With Inductively Coupled Module"; U.S. Appl. No. 12/398,497, filed Mar. 5, 2009.
Official Communication issued in International Patent Application No. PCT/JP2008/050945, mailed on May 1, 2008.
Kato et al.: "Article Having Electromagnetic Coupling Module Attached Thereto"; U.S. Appl. No. 12/401,767, filed Mar. 11, 2009.
Taniguchi et al.: "Antenna Device and Radio Frequency IC Device"; U.S. Appl. No. 12/326,117, filed Dec. 2, 2008.
Official Communication issued in International Patent Application No. PCT/JP2008/061442, mailed on Jul. 22, 2008.
Kato et al.: "Container With Electromagnetic Coupling Module"; U.S. Appl. No. 12/426,369, filed Apr. 20, 2009.
Kato: "Wireless IC Device"; U.S. Appl. No. 12/429,346, filed Apr. 24, 2009.
Official communication issued in counterpart International Application No. PCT/JP2008/071502, mailed Feb. 24, 2009.
Kato et al.: "Wireless IC Device and Manufacturing Method Thereof," U.S. Appl. No. 12/432,854, filed Apr. 30, 2009.
Official communication issued in counterpart International Application No. PCT/JP2008/058168, mailed Aug. 12, 2008.
Official communication issued in counterpart International Application No. PCT/JP2008/062886, mailed Oct. 21, 2008.
Kato et al.: "Wireless IC Device," U.S. Appl. No. 12/469,896, filed May 21, 2009.
Ikemoto et al.: "Wireless IC Device," U.S. Appl. No. 12/496,709, filed Jul. 2, 2009.
Official communication issued in counterpart International Application No. PCT/JP2008/062947, mailed Aug. 19, 2008.
Official communication issued in counterpart International Application No. PCT/JP2008/056026, mailed Jul. 1, 2008.
Ikemoto et al.: "Wireless IC Device and Electronic Apparatus," U.S. Appl. No. 12/503,188, filed Jul. 15, 2009.
Official communication issued in counterpart International Application No. PCT/JP2008/055567, mailed May 20, 2008.
Official communication issued in counterpart International Application No. PCT/JP2008/051853, mailed Apr. 22, 2008.
Official communication issued in counterpart International Application No. PCT/JP2008/057239, mailed Jul. 22, 2008.
Kimura et al.: "Wireless IC Device," U.S. Appl. No. 12/510,338, filed Jul. 28, 2009.
Kato et al.: "Wireless IC Device," U.S. Appl. No. 12/510,340, filed Jul. 28, 2009.
Kato et al.: "Wireless IC Device," U.S. Appl. No. 12/510,347, filed Jul. 28, 2009.
Official Communication issued in corresponding European Patent Application No. 08710785.0, mailed on Jul. 19, 2010.
English translation of NL9100176, published on Mar. 2, 1992.
English translation of NL9100347, published on Mar. 2, 1992.
Kato et al.: "Antenna"; U.S. Appl. No. 11/928,502, filed Oct. 30, 2007.
Kato et al.: "Wireless IC Device"; U.S. Appl. No. 12/211,117, filed Sep. 16, 2008.
Kato et al.: "Antenna"; U.S. Appl. No. 11/688,290, filed Mar. 20, 2007.
Kato et al.: "Electromagnetic-Coupling-Module-Attached Article"; U.S. Appl. No. 11/740,509, filed Apr. 26, 2007.
Kato et al.: "Product Including Power Supply Circuit Board"; U.S. Appl. No. 12/234,949, filed Sep. 22, 2008.
Kato et al.: "Data Coupler"; U.S. Appl. No. 12/252,475, filed Oct. 16, 2008.
Kato et al.; "Information Terminal Device"; U.S. Appl. No. 12/267,666, filed Nov. 10, 2008.
Kato et al.: "Wireless IC Device and Wireless IC Device Composite Component"; U.S. Appl. No. 12/276,444, filed Nov. 24, 2008.
Dokai et al.: "Optical Disc"; U.S. Appl. No. 12/326,916, filed Dec. 3, 2008.
Dokai et al.: "System for Inspecting Electromagnetic Coupling Modules and Radio IC Devices and Method for Manufacturing Electromagnetic Coupling Modules and Radio IC Devices Using the System"; U.S. Appl. No. 12/274,400, filed Nov. 20, 2008.
Kato: "Wireless IC Device"; U.S. Appl. No. 11/964,185, filed Dec. 26, 2007.
Kato et al.: "Radio Frequency IC Device"; U.S. Appl. No. 12/336,629, filed Dec. 17, 2008.
Kato et al.: "Wireless IC Device and Component for Wireless IC Device"; U.S. Appl. No. 12/339,198, filed Dec. 19, 2008.
Ikemoto et al.: "Wireless IC Device"; U.S. Appl. No. 11/851,651, filed Sep. 7, 2007.
Kataya et al.: "Wireless IC Device and Electronic Device"; U.S. Appl. No. 11/851,661, filed Sep. 7, 2007.
Dokai et al.: "Antenna and Radio IC Device"; U.S. Appl. No. 12/350,307, filed Jan. 8, 2009.
Official communication issued in Japanese Application No. 2007-531524, mailed on Sep. 11, 2007.
Official communication issued in Japanese Application No. 2007-531525, mailed on Sep. 25, 2007.
Official communication issued in Japanese Application No. 2007-531524, mailed on Dec. 12, 2007.
Official communication issued in European Application No. 07706650.4, mailed on Nov. 24, 2008.
Mukku-Sha, "Musen IC Tagu Katsuyo-no Subete" "(All About Wireless IC Tags"), RFID, pp. 112-126.
Dokai et al.: "Wireless IC Device and Component for Wireless IC Device"; U.S. Appl. No. 11/624,382, filed Jan. 18, 2007.
Dokai et al.: "Wireless IC Device, and Component for Wireless IC Device"; U.S. Appl. No. 11/930,818, filed Oct. 31, 2007.
Kato et al.: "Wireless IC Device"; U.S. Appl. No. 12/042,399, filed Mar. 5, 2008.
Official communication issued in related U.S. Appl. No. 12/042,399; mailed on Aug. 25, 2008.

* cited by examiner

WIRELESS IC DEVICE

BACKGROUND OF THE INVENTION

1. Field of the Invention

The present invention relates to wireless IC devices. More particularly, the present invention relates to a wireless-IC-chip containing wireless IC device for use in a radio frequency identification (RFID) system.

2. Description of the Related Art

In recent years, RFID systems have been developed as an article management system in which communication is performed in a contactless manner between a reader/writer that generates an induction field and an IC chip (also referred to as an IC tag and a wireless IC chip) that is affixed to an article or a container and that stores predetermined information, whereby information is exchanged. In the related art, a device disclosed in Japanese Unexamined Patent Application Publication No. 2005-244778 is known as a wireless IC device including an IC chip.

The wireless IC device includes an IC chip, main antenna elements, an auxiliary antenna element, and matching units. The IC chip and the main antenna elements are arranged to be electrically connected through the matching units. Additionally, impedance between the IC chip and the main antenna elements is matched by adjusting inductance generated by lines of the matching units and capacitance generated between electrodes of the main antenna elements and the auxiliary antenna element.

However, since matching is performed in the wireless IC device only in a frequency determined by the inductance of the matching units and the capacitance generated between the main antenna elements and the auxiliary antenna element, the wireless IC device undesirably has a narrow usable frequency band. Additionally, since matching capacitance is controlled by a gap between antenna electrodes, the gap has to be narrowed to increase the capacitance. Accordingly, a change in the capacitance undesirably increases due to gap variance and a frequency characteristic undesirably varies. Furthermore, since the IC chip and the main antenna elements are electrically connected, static electricity from the main antenna elements is applied directly to the IC chip, which undesirably damages the IC chip.

SUMMARY OF THE INVENTION

Accordingly, preferred embodiments of the present invention provide a wireless IC device that has small frequency-characteristic variance and is suitably used in an RFID system. Additionally, preferred embodiments of the present invention provide a wireless IC device that can operate in a wide band and is suitably used in an RFID system.

According to a preferred embodiment of the present invention, a wireless IC device includes a wireless IC chip including an input/output terminal and arranged to process transmission and reception signals, a feeder circuit board on which a connection electrode to be connected to the input/output terminal and a planar electrode electrically connected to the connection electrode are provided, a linear electrode that is arranged to be electromagnetically coupled to the planar electrode, and a radiation plate that is arranged to be electrically connected to the linear electrode, wherein the wireless IC chip is mounted on the feeder circuit board to constitute an electromagnetic coupling module, a signal received by the radiation plate drives the wireless IC chip and a response signal from the wireless IC chip is transmitted to the outside from the radiation plate, and a frequency of a signal to be transmitted and received by the radiation plate is substantially determined by inductance of the linear electrode and capacitance between the linear electrode and the planar electrode.

Preferably, the linear electrode is constituted by a plurality of neighboring electrodes. The linear electrode may be a single electrode or may be a plurality of loop electrodes.

Since impedance of the wireless IC chip and the radiation plate is matched by adjusting inductance of the linear electrode and capacitance generated between the planar electrode and the linear electrode in the wireless IC device according to a preferred embodiment of the present invention, capacitance variance decreases, as a result of which frequency-characteristic variance reduces. When the linear electrode includes a plurality of loops, capacitance between lines of the linear electrode is also used in impedance matching. Furthermore, by setting different line lengths for the plurality of neighboring electrodes, a resonance frequency can be appropriately set for each linear electrode and a wide-band gain characteristic can be obtained.

In the wireless IC device according to a preferred embodiment of the present invention, an end portion of the linear electrode may be arranged to face the planar electrode and may be coupled to the planar electrode through an electric field. Since the wireless IC chip and the radiation plate are not electrically connected directly, static electricity from the radiation plate is not applied to the wireless IC chip and, thus, it is possible to prevent the statistic electricity from damaging the wireless IC chip. Furthermore, a large capacitance value can be set for capacitance generated between the planar electrode and the end portion of the linear electrode and capacitance variance due to variance in a gap between lines of the linear electrode can be decreased, which thus reduces variance in a usable frequency.

In addition, the planar electrodes may be arranged on different principal surfaces of the feeder circuit board so as to face each other. By arranging the planar electrodes on the respective principal surfaces of the substrate, capacitance using the substrate as a dielectric can be formed between the planar electrodes. By combining this capacitance with capacitance between the feeder circuit board and the radiation plate, fine adjustment of the capacitance value becomes easier and the resonance-frequency variance and the impedance variance can be reduced.

Additionally, the linear electrode and the radiation plate may be arranged symmetrically with respect to the wireless IC chip. With this configuration, a radiation characteristic of the left and right radiation plates can be made equal and designing of impedance matching becomes easier.

An insulating film may be arranged on the feeder circuit board so as to cover at least the planar electrode. Alternatively, an insulating film may be arranged on a substrate having the radiation plate located thereon so as to cover the radiation plate. Since the planar electrode and the radiation plate are protected by the insulating film, environmental resistance (particularly, a rust prevention effect) improves. Furthermore, the feeder circuit board or the radiation plate can be individually sold in the market.

The wireless IC chip may rewrite information in addition to storing various kinds of information regarding articles to which the wireless IC device is attached and may have information processing functions other than that for an RFID system.

According to various preferred embodiments of the present invention, since impedance between a wireless IC chip and a radiation plate functioning as an antenna is matched using a planar electrode provided on a feeder circuit board and a liner electrode electromagnetically coupled to the planar electrode, capacitance variance and frequency-characteristic variance decrease. Additionally, since a different resonance frequency can be set for each linear electrode, a wide-band gain characteristic can be obtained.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Wireless IC devices according to preferred embodiments of the present invention will be described below with reference to the accompanying drawings. Common components and elements are attached with similar references throughout the drawings to omit a repeated description.

Figure 1:
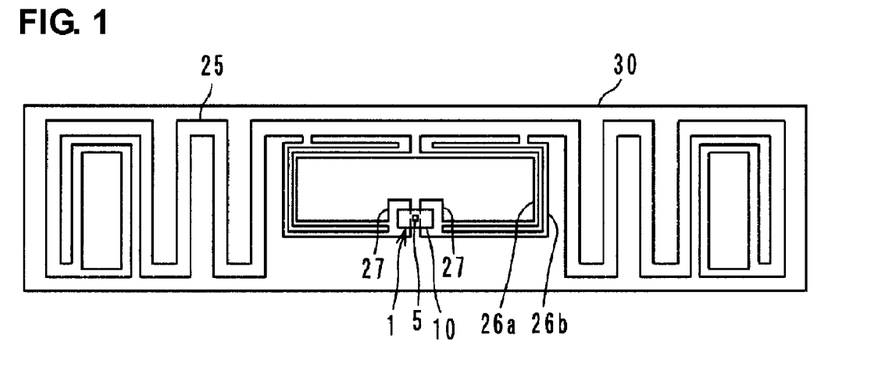
FIG. 1 is a plan view showing a wireless IC device according to a first preferred embodiment of the present invention.
Figure 2:
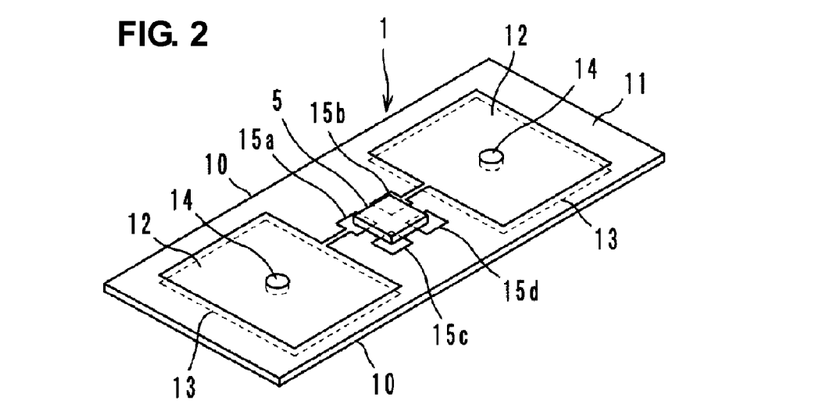
FIG. 2 is a perspective view showing a feeder circuit board constituting the first preferred embodiment of the present invention.
Figure 3:
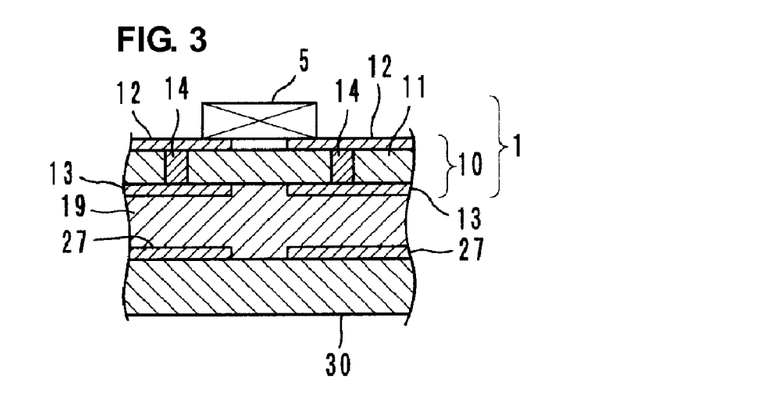
FIG. 3 is a major sectional view showing the first preferred embodiment of the present invention.
Figure 4:
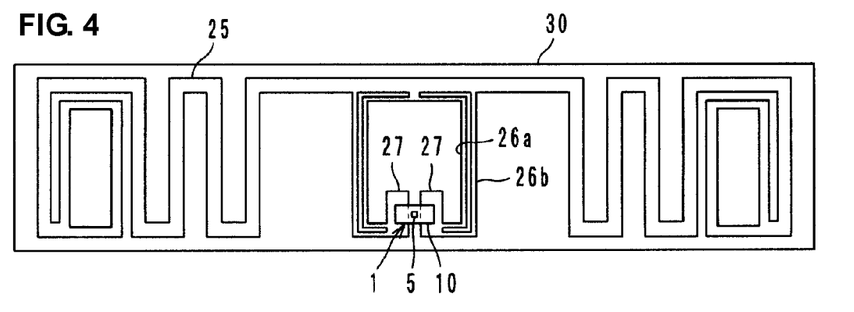
FIG. 4 is a plan view showing a modification of loop electrodes.
Figure 5:
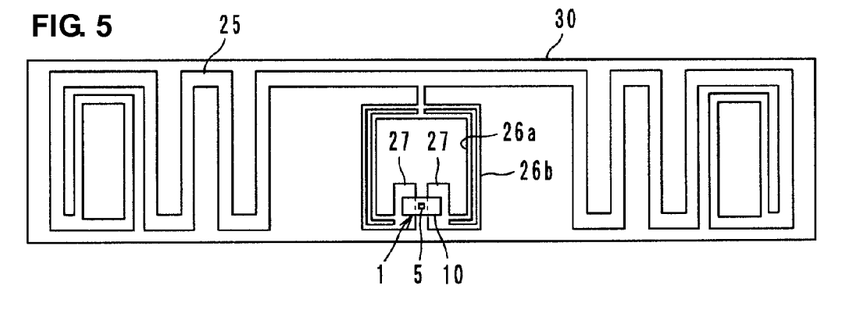
FIG. 5 is a plan view showing another modification of loop electrodes.
Figure 6:
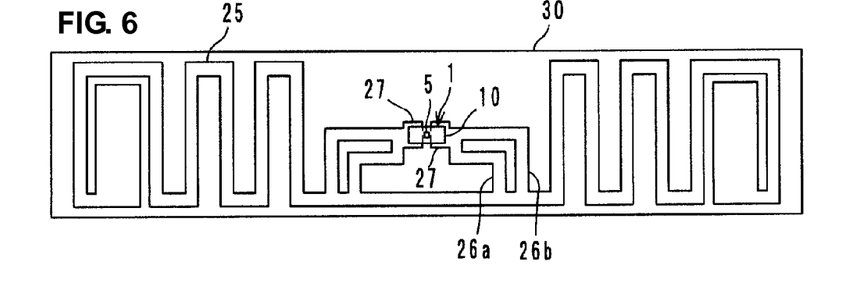
FIG. 6 is a plan view showing another modification of loop electrodes.
Figure 7:
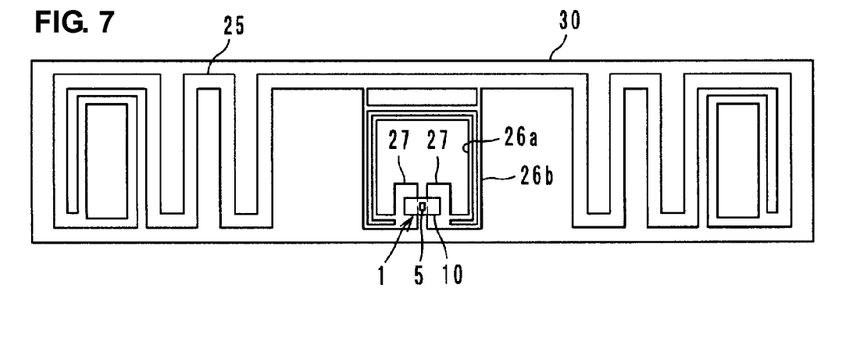
FIG. 7 is a plan view showing another modification of loop electrodes.
Figure 8:
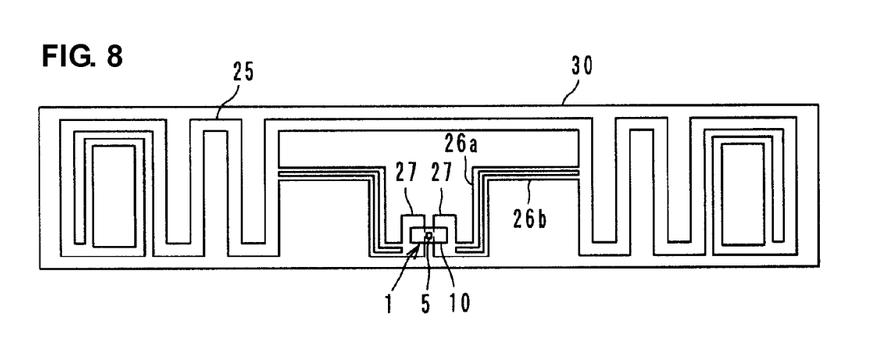
FIG. 8 is a plan view showing another modification of loop electrodes.
Figure 9:
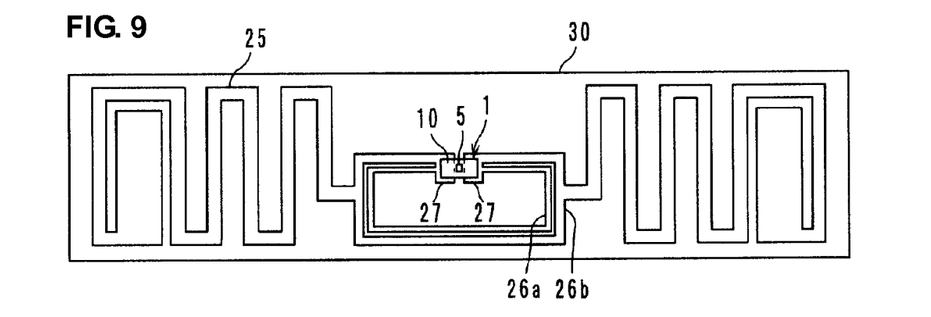
FIG. 9 is a plan view showing another modification of loop electrodes.

First Preferred Embodiment, FIG. 1 to FIG. 3

FIG. 1 to FIG. 3 show a wireless IC device according to a first preferred embodiment of the present invention. This wireless IC device includes an electromagnetic coupling module 1 and a radiation plate 25 disposed on a PET film substrate 30. The electromagnetic coupling module includes a wireless IC chip 5 arranged to process transmission and reception signals of a predetermined frequency and a feeder circuit board 10 having the wireless IC chip 5 mounted thereon.

In the feeder circuit board 10, a pair of planar electrodes 12 and a pair of planar electrodes 13 are arranged on front and back surfaces of a PET film substrate 11, respectively, so as to face each other. The planar electrodes 12 and 13 are electrically connected by via-hole conductors 14. Connection electrodes 15a-15d electrically connected to the planar electrodes 12 are provided on the front surface of the film substrate 11. These electrodes 12, 13, and 15a-15d are preferably formed on the film substrate 11 in accordance with a known thick or thin film forming method using conductive materials.

The electrodes 15a and 15b are electrically connected to input/output terminals (not shown) of the wireless IC chip 5. The electrodes 15c and 15d are electrically connected to ground terminals (not shown) of the wireless IC chip 5. This connection is made using a metal bump or the like. The wireless IC chip 5 may preferably include a clock circuit, a logic circuit, and a memory circuit, and stores necessary information.

An insulating-material layer may be provided between the electrodes 15a and 15b and the input/output terminals of the wireless IC chip 5 so that the electrodes and the input/output terminals are capacitively coupled.

The radiation plate 25 is provided on both sides of the wireless IC chip 5. More specifically, the radiation plate preferably has a symmetric meander shape and includes loop electrodes 26a and 26b which preferably include linear electrodes shown in FIG. 1. The loop electrodes 26a and 26b have relatively wide portions 27 and 27 at respective ends thereof. The wide portions 27 and 27 face the planar electrodes 13 and 13, respectively. The radiation plate 25 including the loop electrodes 26a and 26b is formed preferably by adhering a thin metal sheet of a conductive material, such as aluminum or copper foil, onto the film substrate 30 or preferably by providing conductive paste, such as Al, Cu, and Ag, or metallic plating on the film substrate 30.

As shown in FIG. 3, the electromagnetic coupling module 1 is adhered onto the film substrate 30 preferably via an insulating adhesive 19 having a high dielectric constant, for example, so that the planar electrodes 13 and 13 face and are electrically coupled to the wide portions 27 and 27 of the loop electrodes 26a and 26b, respectively.

In the wireless IC device having the above-described configuration, impedance of the wireless IC chip 5 and the radiation plate 25 is matched by adjusting inductances L1 and L2 formed by the inner loop electrode 26a and the outer loop electrode 26b, capacitance C generated between the planar electrodes 13 and 13 and the wide portions 27 and 27 of the loop electrodes 26a and 26b, and capacitance between lines of the loop electrodes 26a and 26b, respectively. Accordingly, capacitance variance decreases and frequency-characteristic variance also decreases. Additionally, resonance circuits constituted by the inductances L1 and L2, the capacitance C, and the capacitance between lines of the loop electrodes 26a and 26b determine a resonance frequency characteristic. A resonance frequency of a signal radiated from the radiation plate 25 substantially corresponds to a self-resonance frequency of the resonance circuit. Furthermore, different line lengths of the loop electrodes 26a and 26b provide different resonance frequencies (peak wavelengths) for the loop electrodes 26a and 26b. The wireless IC device can operate in a wide band (e.g., approximately 915 MHz±50 MHz) between the two peak values.

More specifically, this wireless IC device receives a high-frequency signal (e.g., in a UHF frequency band) radiated from a reader/writer, not shown, with the radiation plate 25 and supplies only a reception signal of a predetermined frequency band to the wireless IC chip 5 through the planar electrodes 13 that are mainly electrically (capacitively) coupled to the loop electrodes 26a and 26b (by resonating two LC resonance circuits composed of the inductances L1 and L2 and the capacitance C in an equivalent circuit). On the other hand, the wireless IC device extracts predetermined energy from this reception signal, converts information stored in the wireless IC chip 5 to a signal of a predetermined frequency by the resonance circuit using this extracted energy as a driving source, propagates the transmission signal from the loop electrodes 26a and 26b to the radiation plate 25, and transmits and transfers the transmission signal to the reader/writer from the radiation plate 25.

Although the coupling between the planar electrodes 13 and 13 and the loop electrodes 26a and 26b is mainly through an electric field, coupling through a magnetic field may exist. In the present invention, "electromagnetic coupling" indicates coupling through an electric field and/or a magnetic field.

Since large capacitive coupling is generated by the wide portions 27 of the loop electrodes 26a and 26b and the planar electrodes 13, impedance matching between the wireless IC chip 5 and the radiation plate 25 can be performed using this large capacitance. Furthermore, since the wireless IC chip 5 and the radiation plate 25 are not directly connected electrically, it is possible to prevent the wireless IC chip 5 from being damaged by static electricity that is an energy wave not greater than about 200 MHz coming from the radiation plate 25.

Stray capacitance is generated between the loop electrodes 26a and 26b and affects the impedance matching or the resonance frequency. However, by setting a large capacitance value for the capacitance generated between the planar electrodes 13 and the wide portions 27 of the loop electrodes 26a and 26b, capacitance variance due to variance in a gap between the loop electrodes 26a and 26b can be reduced, which further reduces variance in a usable frequency.

Although the wide portions 27 of the loop electrodes 26a and 26b and the planar electrodes 13 are preferably capacitively coupled in the first preferred embodiment, they may be directly connected electrically. In such a case, impedance matching is performed by adjusting stray capacitance between the loop electrodes 26a and 26b and inductances L1 and L2 of the loop electrodes 26a and 26b, respectively.

Modifications of Loop Electrodes, FIG. 4 to FIG. 9

The loop electrodes 26a and 26b may have various shapes. FIG. 4 to FIG. 9 show various modifications regarding the shape of the loop electrodes 26a and 26b. The loop electrodes may have a shape other than those shown by the illustrated modifications.

Figure 10:
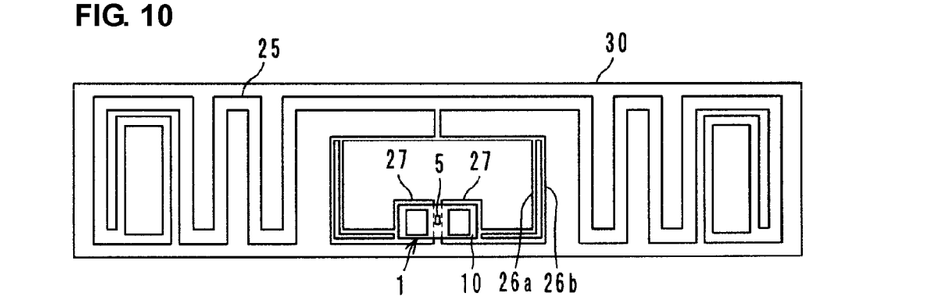
FIG. 10 is a plan view showing a wireless IC device according to a second preferred embodiment of the present invention.
Figure 11:
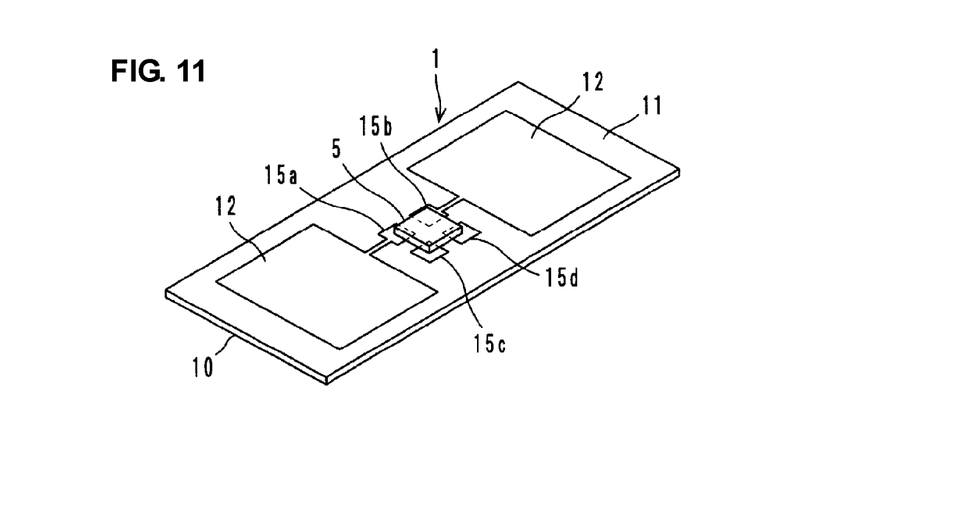
FIG. 11 is a perspective view showing a feeder circuit board constituting the second preferred embodiment of the present invention.
Figure 12:
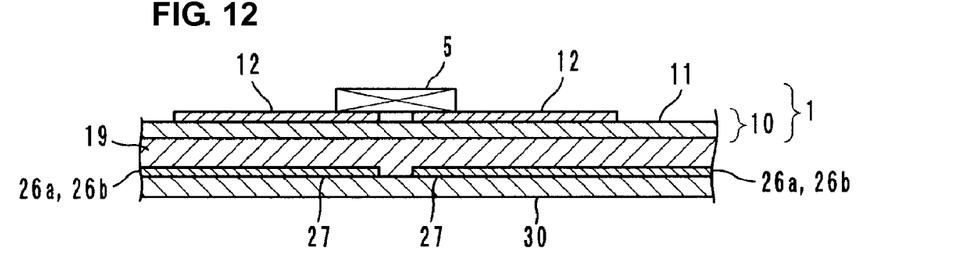
FIG. 12 is a major sectional view showing the second preferred embodiment of the present invention.

Second Preferred Embodiment, FIG. 10 to FIG. 12

FIG. 10 to FIG. 12 show a wireless IC device according to a second preferred embodiment of the present invention. This wireless IC device is similar to that described in the first preferred embodiment in that the wireless IC device includes an electromagnetic coupling module 1, which includes a wireless IC chip 5 and a feeder circuit board 10, and a radiation plate 25, which includes loop electrodes 26a and 26b. A difference therebetween is that only planar electrodes 12 and 12 are provided on a front surface of a substrate 11 of the feeder circuit board 10.

As shown in FIG. 12, the planar electrodes 12 and 12 and wide portions 27 and 27 of the loop electrodes 26a and 26b are electrically coupled through an adhesive 19 and the film substrate 11 in the second preferred embodiment. Impedance matching is performed by adjusting inductances L1 and L2 of the inner loop electrode 26a and the outer loop electrode 26b and capacitance C generated between the planar electrodes 12 and 12 and the wide portions 27 and 27 of the loop electrodes 26a and 26b, respectively. Accordingly, advantages of the second preferred embodiment are similar to those of the first preferred embodiment.

Figure 13:
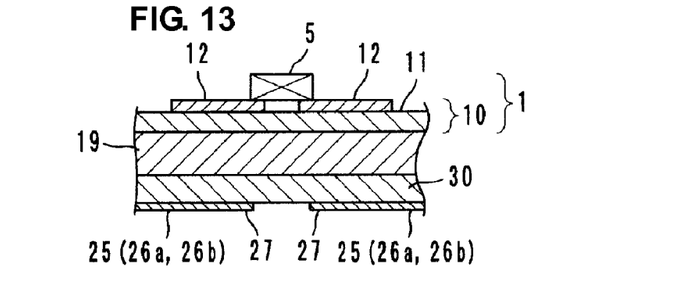
FIG. 13 is a sectional view showing a modification 1 of the second preferred embodiment of the present invention.
Figure 14:
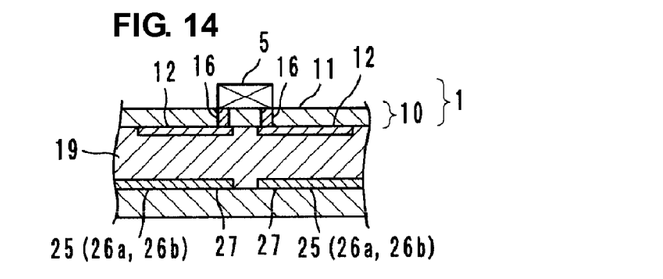
FIG. 14 is a sectional view showing a modification 2 of the second preferred embodiment of the present invention.

Modifications of Second Preferred Embodiment, FIG. 13 and FIG. 14

FIG. 13 shows a modification 1 of the second preferred embodiment. In this wireless IC device, the radiation plate 25 and the loop electrodes 26a and 26b are disposed on a back surface of a film substrate 30. Accordingly, the wide portions 27 of the loop electrodes 26a and 26b and the planar electrodes 12 and 12 are electrically coupled through the film substrate 30, the adhesive 19, and the film substrate 11.

FIG. 14 shows a modification 2 of the second preferred embodiment. In this wireless IC device, the planar electrodes 12 and 12 are provided on a back surface of the film substrate 11. The planar electrodes 12 and 12 are electrically connected to terminals of the wireless IC chip 5 through via-hole conductors 16. Accordingly, the wide portions 27 of the loop electrodes 26a and 26b and the planar electrodes 12 and 12 are electrically coupled only through the adhesive 19.

Figure 15:
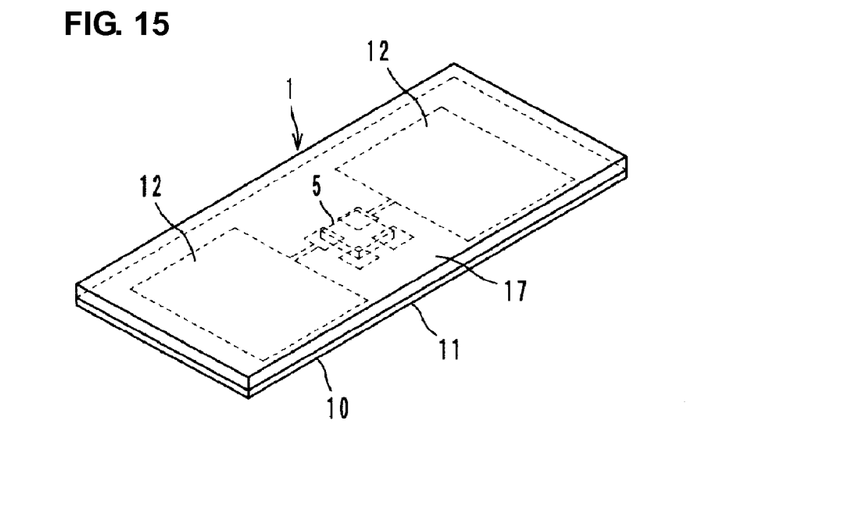
FIG. 15 is a perspective view showing a feeder circuit board constituting a wireless IC device according to a third preferred embodiment of the present invention.
Figure 16:
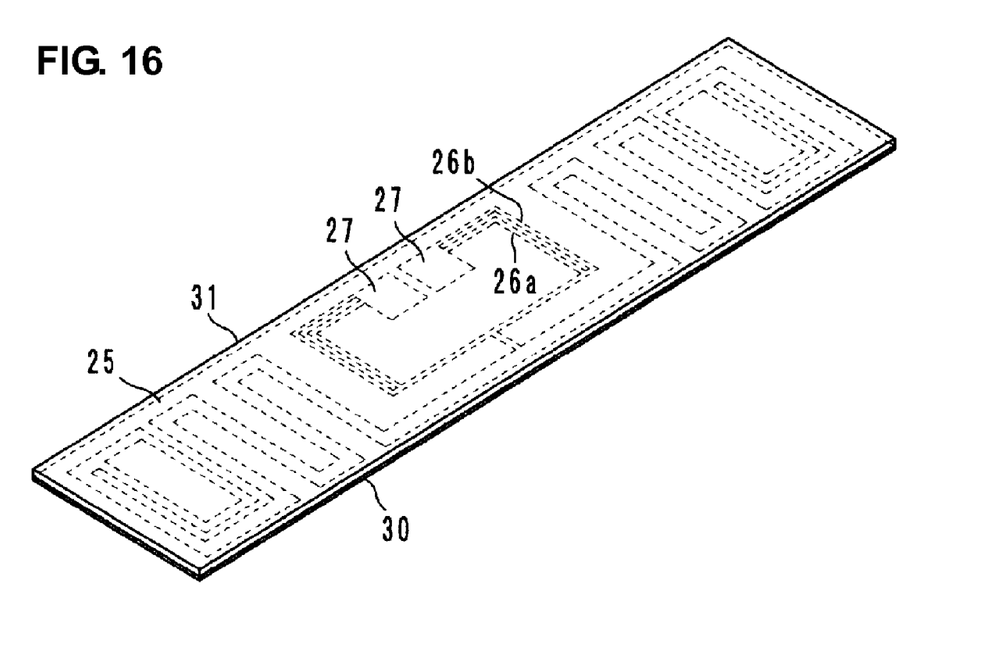
FIG. 16 is a perspective view showing a radiation plate constituting a wireless IC device according to a fourth preferred embodiment of the present invention.

Third and Fourth Preferred Embodiments, FIG. 15 and FIG. 16

In a wireless IC device according to a third preferred embodiment shown in FIG. 15, an insulating film 17 is provided on a film substrate 11 of a feeder circuit board 10 shown in FIG. 11 to cover planar electrodes 12 and 12 and a wireless IC chip 5. The insulating film 17 is arranged to cover at least the planar electrodes 12 and 12.

In a wireless IC device according to a fourth preferred embodiment shown in FIG. 16, an insulating film 31 is arranged on a film substrate 30 shown in FIG. 10 to cover a radiation plate 25 and loop electrodes 26a and 26b. A coating material of an epoxy series or a silicon series, for example, can be used as the insulating films 17 and 31.

According to the third and fourth preferred embodiments, since the planar electrodes 12 and 12 and the radiation plate 25 are protected by the insulating films 17 and 31, an advantage regarding rust prevention is provided in addition to the advantages of the second preferred embodiment and environmental resistance improves. Furthermore, the feeder circuit board 10 or the radiation plate 25 can be individually sold in the market and the radiation plate 25 in various shapes and sizes can be combined with the feeder circuit board 10, as a result of which options broaden when a user wants to increase antenna gain. The radiation plate 25 may be printed on an article wrapping material for use in an RFID system and may be covered with the insulating film 31.

A problem that the planar electrodes 12 and 12 and the radiation plate 25 peel off from the film substrates 11 and 30 can be solved. The feeder circuit board 10 and the radiation plate 25 can be adhered with a general adhesive, for example. Various inexpensive low-melting materials, such as metal leaf and a vapor deposition material of tin, for example, can be used for the radiation plate 25. Moreover, since unnecessary tensile stress is not applied to the planar electrodes 12 and the radiation plate 25 at the time of adhesion of the feeder circuit board 10 and the radiation plate 25, reliability of the wireless IC device improves.

Other Preferred Embodiments

Wireless IC devices according to the present invention are not limited to the above-described preferred embodiments and can be variously modified within the scope of the spirit thereof.

For example, materials of the radiation plate 25 and the film substrates 11 and 30 described in the preferred embodiments are only examples and given materials having a necessary characteristic can be used. Additionally, processing other than a metal bump may be used to connect a wireless IC chip and planar electrodes.

Although the loop electrodes and the radiation plate preferably are symmetrically arranged in each of the preferred embodiments, the loop electrodes and the radiation plate do not have to be formed symmetrically and each of the loop electrodes may be electrically connected to the radiation plate at different positions.

As described above, the present invention is suitable for a wireless IC device for use in an RFID system and, particularly, has small frequency-characteristic variance advantageously.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A wireless IC device comprising:
   a wireless IC chip including a first input/output terminal and a second input/output terminal and being arranged to process transmission and reception signals;
   a loop electrode including a first end connected to the first input/output terminal and a second end connected to the second input/output terminal; and
   a radiation plate arranged to be electrically connected to the loop electrode; wherein
   a signal received by the radiation plate drives the wireless IC chip and a response signal from the wireless IC chip is transmitted to outside from the radiation plate; and
   the loop electrode includes neighboring linear electrodes having different line lengths.

2. The wireless IC device according to claim 1, wherein the neighboring linear electrodes of the loop electrode are electrically connected to the radiation plate at positions different from the first and second ends of the loop electrode.

3. The wireless IC device according to claim 1, wherein the loop electrode and the radiation plate are located on a common substrate.

4. The wireless IC device according to claim 1, wherein the neighboring linear electrodes are electrically connected to the radiation plate at different positions.

5. The wireless IC device according to claim 1, wherein the loop electrode and the radiation plate are symmetrically arranged with respect to the wireless IC chip.

6. The wireless IC device according to claim 1, further comprising a flexible substrate upon which the loop electrode and the radiation plate are disposed.

7. The wireless IC device according to claim 1, wherein an insulating film is arranged to cover the radiation plate.

8. The wireless IC device according to claim 1, further comprising:
   a feeder circuit board including a connection electrode arranged to be connected to one of the first and second input/output terminals of the wireless IC chip and a planar electrode electrically connected to the connection electrode.

9. The wireless IC device according to claim 8, wherein an insulating film is arranged on the feeder circuit board so as to cover at least the planar electrode.

10. The wireless IC device according to claim 8, wherein one of the first and second ends of the loop electrode is arranged to face the planar electrode and is connected to the planar electrode through an electric field.

11. The wireless IC device according to claim 8, wherein a plurality of the planar electrodes are arranged on different principal surfaces of the feeder circuit board so as to face each other.

12. The wireless IC device according to claim 11, wherein the facing planar electrodes are electrically connected.

13. The wireless IC device according to claim 8, wherein the feeder circuit board is made of a flexible substrate.

14. The wireless IC device according to claim 8, wherein an insulating film is arranged to cover the planar electrode and to face the radiation plate.

* * * * *